(12) United States Patent
Meyer

(10) Patent No.: US 9,986,209 B2
(45) Date of Patent: May 29, 2018

(54) METHOD AND SYSTEM FOR MANAGING DATA FROM DIGITAL NETWORK SURVEILLANCE CAMERAS

(71) Applicant: Steven Philip Meyer, Richmond Hill (CA)

(72) Inventor: Steven Philip Meyer, Richmond Hill (CA)

(73) Assignee: Steven Philip Meyer, Richmond Hill (CA)

( * ) Notice: Subject to any disclaimer, the term of this patent is extended or adjusted under 35 U.S.C. 154(b) by 346 days.

(21) Appl. No.: 14/181,227

(22) Filed: Feb. 14, 2014

(65) Prior Publication Data
US 2014/0232874 A1  Aug. 21, 2014

Related U.S. Application Data

(60) Provisional application No. 61/765,153, filed on Feb. 15, 2013.

(51) Int. Cl.
*H04N 7/18* (2006.01)
*G08B 13/196* (2006.01)

(52) U.S. Cl.
CPC ....... *H04N 7/181* (2013.01); *G08B 13/19669* (2013.01); *G08B 13/19671* (2013.01); *G08B 13/19676* (2013.01); *G08B 13/19682* (2013.01); *G08B 13/19691* (2013.01); *G08B 13/19656* (2013.01)

(58) Field of Classification Search
CPC ........ G08B 13/19656; G08B 13/19671; G08B 13/19676
See application file for complete search history.

(56) References Cited

U.S. PATENT DOCUMENTS

| | | | | |
|---|---|---|---|---|
| 6,970,183 | B1* | 11/2005 | Monroe | G08B 7/062 348/143 |
| 8,644,702 | B1* | 2/2014 | Kalajan | H04N 21/64784 396/429 |
| 2003/0067387 | A1* | 4/2003 | Kwon | G08B 13/1968 340/540 |
| 2003/0085998 | A1* | 5/2003 | Ramirez-Diaz | G08B 13/1961 348/143 |
| 2004/0240542 | A1* | 12/2004 | Yeredor | G06K 9/00771 375/240.01 |
| 2007/0143271 | A1* | 6/2007 | Yuval | G06F 17/30864 |
| 2008/0091845 | A1* | 4/2008 | Mills | G06F 17/30902 709/246 |
| 2008/0270978 | A1* | 10/2008 | Leung | G06F 9/4443 717/106 |
| 2009/0295925 | A1* | 12/2009 | Miyamaki | H04N 1/00286 348/159 |

(Continued)

*Primary Examiner* — MD Haque
(74) *Attorney, Agent, or Firm* — Norton Rose Fulbright Canada LLP; Niall Cooney

(57) ABSTRACT

A computer implemented method of establishing and managing an arbitrarily large, geographically distributed video surveillance network is provided. The method comprises a plurality of independent video processing components operatively coupled by a data network, each independent video processing component configured to implement one or more tasks, the one or more tasks comprising video capture, relaying, recording, processing, storage, analysis and event-monitoring of video and audio files and information.

32 Claims, 9 Drawing Sheets

(56) References Cited

U.S. PATENT DOCUMENTS

| | | | |
|---|---|---|---|
| 2010/0033575 A1* | 2/2010 | Lee | H04N 7/18 348/159 |
| 2010/0058053 A1* | 3/2010 | Wood | G06F 21/31 713/155 |
| 2011/0016319 A1* | 1/2011 | Lundberg | G06F 21/83 713/170 |
| 2011/0022519 A1* | 1/2011 | Pan | G06Q 30/02 705/51 |
| 2011/0090334 A1* | 4/2011 | Hicks, III | G08B 13/19656 348/143 |
| 2011/0106826 A1* | 5/2011 | Swanbeck | G06F 17/30011 707/758 |
| 2011/0299835 A1* | 12/2011 | Fleming | H04N 5/77 386/280 |
| 2012/0036364 A1* | 2/2012 | Yoneda | H04L 9/30 713/175 |
| 2012/0059800 A1* | 3/2012 | Guo | G06F 17/30138 707/664 |
| 2012/0221687 A1* | 8/2012 | Hunter | G06F 17/30029 709/219 |
| 2013/0031162 A1* | 1/2013 | Willis | H04L 67/02 709/203 |
| 2013/0163963 A1* | 6/2013 | Crosland | H04N 9/8211 386/285 |

* cited by examiner

Device Configuration

Name: cam17
Address: 192.168.1.110
Video Profile: profile_stream3:JPEG 640x360 max 12 bits/s
Recording profile: Motion
Device-id: 36098920-1785-11e2-97fc-6b20719b11ac
Hardware: Brand-x
Model: v982
Version: v1.6
Event Detection: yes
PTZ capable: no
Security credentials: accepted
Location Membership:
- ☐ Zone1
- ☐ Zone5

[new] [del]

Admit to the Network:
○ Ignore this device  ● Include this device in the network  ○ Blacklist this device

FIG. 8

Location Configuration

Name: facility1

Parent Location: System

Child Locations: [new] [del]
- ☐ Zone1
- ☐ Zone2
- ☐ ground floor
- ☐ reception
- ☐ Zone5

Users with access to this location: [new] [del]
- ☐ admin
- ☐ steven
- ☐ sharon
- ☐ matt

FIG.9

METHOD AND SYSTEM FOR MANAGING DATA FROM DIGITAL NETWORK SURVEILLANCE CAMERAS

FIELD

This invention relates to managed computer networks. This invention further relates to Network Digital Video Surveillance.

BACKGROUND

Since the appearance of digital video streaming protocols and IP Network cameras around the beginning of the 21st century, video surveillance has been evolving into an all-digital environment of ever-increasing size and complexity.

Whereas the digital video recorders (DVR) of today provide 16, 32 and even 64 channels of recording for analog cameras, the networking of digital IP network cameras and similar devices allows networks of unrestricted size to be set up. The consequence of this is that a vast and distributed body of video data is generated that must be collected, stored, catalogued and managed. A common apparatus for recording such video is the Network Video Recorder (NVR) and a plurality of Network Video Recorders are generally used to create larger systems.

Furthermore, the increased sophistication of these cameras and video devices may result in multiple video streams per device, plus the ability for each device to perform environment and scene analysis and transmit event and status messages to the network. Video analytics, such as recognizing faces, vehicles, license plates and more, provide richer data intelligence than was available before.

Capabilities of network IP cameras have also become more standardized with the emergence of interface protocols such as ONVIF and PSIA. Furthermore, the popularity of video clips used for entertainment and education on sites such as YouTube™ (www.youtube.com) has resulted in a high degree of openness and standardization of technologies, for example, multimedia format HTML5 from the World Wide Web Consortium (W3C) (www.w3.org).

In contrast to entertainment systems, video surveillance systems still tend to be largely proprietary to one vendor or another, and standardization in general has been uneven. There are therefore significant improvements in video quality, flexibility, scalability, reliability, inter-vendor operability and cost-effectiveness to be gained from being able to separately record, process, analyze, store, manage, search and retrieve video-stream (video) and video-event (event) information as well as maintain the relationships between these two kinds of information.

Although the speed of networks is improving year upon year and excellent video compression technology is becoming more widely available, the increasing demand for more cameras and better resolution images is resulting in an overwhelming amount of video data being generated. It is therefore increasingly uneconomical to provide video transmission to a central location and storage for all cameras on a single server. Furthermore, aggregating too much data in a single location also creates a bottleneck when access to the data is required through a bandwidth limited connection, such as a broadband Internet access connection.

Certain prior art solutions are known that address aspect of networking multiples cameras. For example:

US 2009/0295925: for "Network camera management system and network camera management method", filed on May 14, 2009. This patent application discloses a network camera management system for managing a plurality of cameras connected to a predetermined network.

US 2012/0113265: for "Network video recorder system", filed: Sep. 30, 2011. This patent application discloses a method for implementing a security system for a set of IP-enabled security devices connected by an Ethernet network to a set of local Ethernet ports on a network video recorder.

U.S. Pat. No. 8,117,252: for "Video-monitor/recording/playback system", filed: Dec. 24, 2003. The patent discloses a Network Video Server (NVS) that communicates with networked devices and cameras that are physically wired, or wirelessly connected to a network infrastructure (backbone). Video output, recorded output and system control is made available through standard web browser interfaces that can be connected to the local LAN, or on any remote leg of a WAN to which the server is attached.

Additionally, "Web Services Dynamic Discovery" (WS-Discovery) Version 1.1, OASIS Standard, 1 Jul. 2009 discloses a discovery protocol to locate services. In an ad hoc mode of operation, probes are sent to a multicast group, and target services that match return a response directly to the requester. To scale to a large number of endpoints and to extend the reach of the protocol, the protocol defines a managed mode of operation and a multicast suppression behaviour, if a discovery proxy is available on the network. To minimize the need for polling, target services that wish to be discovered send an announcement when they join and leave the network, which may be found at http://docs.oasis-open.orq/ws-dd/discovery/1.1/os/wsdd-discovery-1.1-spec-os.pdf.

A PELCO TECHNICAL WHITE PAPER entitled "Reducing Costs While Enhancing Reliability of Video Surveillance Storage Systems" discloses operation of IP-based physical security platforms including networked video cameras: which may be found at http://www.pelco.com/documents/whitepapers/en/shared/video-storaqe-whitepaper.pdf.

There is therefore a need for new solutions for networking cameras in a way that addresses some of the problems mentioned above.

SUMMARY

In one aspect, a computer network implemented system and method is provided for managing a plurality of Internet protocol (IP) network video sources and distributed video data components in an IP information network. The system comprises a plurality of components for enabling one or more of: relaying, recording, processing, storage, analysis, viewing, playback, logging and event-monitoring of video and audio information.

In one aspect of the invention, the system and method is based on a network architecture that is designed to be scalable, based on unique and innovative features described herein.

Unlike some prior art systems that are generally designed to a particular size, the computer network implemented system of the present invention is designed to assemble an unrestricted plurality of cameras and recording and processing servers through the data network provided. Significantly, the data network is configured such that network operations may be determined at a local level. This permits video-related data that are distributed over a plurality of different physical locations and are accessible in parallel as a single, integrated system through the interconnections that are created and managed through the data network.

In one aspect, a computer implemented method of establishing and managing an arbitrarily large, geographically distributed video surveillance network comprising a plurality of independent video processing components operatively coupled by a data network is provide. Each independent video processing component configured to implement one or more tasks, the one or more tasks comprising video capture, relaying, recording, processing, storage, analysis and event-monitoring of video and audio files and information, the method comprising the steps of: discovering and registering each video capture component of the plurality of independent video processing components with a distributed database; transmitting streaming data, by each video capture component, to one or more associated recording components of the plurality of independent video processing components; converting the streaming data into a succession of compressed media segments, storing each of the compressed media segments on a storage medium, and transmitting an event notification message to one or more event-monitoring components of the plurality of independent video processing components, by said one or more associated recording components; and transmitting event notification message to one or more event-monitoring components by one or more analysis components of the plurality of independent video processing components; wherein upon receiving the event notification messages from one or more video processing components of the plurality of independent video processing components, the one or more event-monitoring components update the distributed database with received event notification messages.

In another aspect, one or more event notification messages are forwarded to one or more selected video processing components by the one or more event-monitoring components.

In another aspect, the distributed database is operable to use a data format that records status, configuration, events, and recording locations available in the data network, wherein the data format enables one or more video processing components to find and retrieve information needed for live viewing, processing, analysis, display, and playback of videos, and system management.

In yet another aspect, the event notification message and/or the media segment data is digitally signed by respective originator devices in order to certify the integrity of the data.

In yet another aspect, processing the video or audio files is undertaken to transform the video or audio information and to generate the media segments in one or more standard formats suitable for distribution to and/or viewing on client devices.

In still another aspect, one or more video or audio files are tagged to include information representing one or more of: system prefix, identifier of video source, start time of the video or audio, length of recording in seconds, events contained in the media segment and/or format of the each of the one or more video or audio files.

In one aspect, unprocessed video or audio files are retained for further processing, or as redundant data storage to be deleted later.

In another aspect, the processing of the one or more video or audio files comprises encrypting the contents with a digital key, digitally signing video or audio data file and supplementing the video or audio data file with additional information such as camera name or zone.

In another aspect, the distributed database is notified whenever a media segment is added to the storage medium, the notification comprising the location of the one media segment in the storage medium.

In yet another aspect, the location of each of the media segments may vary from one media segment to the next media segment.

In still another aspect, a record of each of the media segments in the distributed database may comprise tag information, device name, device zone, server identifier and/or location of the media segment.

In yet still another aspect, the distributed database is uniformly accessible by all client devices of the data network.

In one aspect, a client device is operable to query the distributed database over the network for one or more media segments and to obtain from the distributed database the identifiers and locations of the one or more media segments.

In another aspect, a client device requiring to view a video file is directed to establish a network connection with the appropriate network data repository.

In another aspect, a client device may obtain continuous video for display by requesting a list of URLs of available media segments stored in the distributed database and retrieving and playing the content stored at each URL in the list of URLs in sequence.

In yet another aspect, a user associated with a client device may download a copy of the current media segment by means of a one-step user selection.

In yet still another aspect, the discovering of a video capture component of the plurality of independent video processing components is performed at geographically distributed locations and comprises determining capabilities, name and zone settings, admission suitability, and security credential validation of one or more devices associated with the video capture component.

In one aspect, the name and zone setting of the one or more devices is undertaken prior to discovering of the device.

In another aspect, the name and zone settings of the device are overridden during or after the discovering process.

In a further aspect, a system management component includes an administrative option to define a plurality of zones to be supported.

In yet another aspect, access by users is controlled on a per-zone basis so that a user may only have access to the media segments and event information associated with one or more zones for which the said user is authorized in the plurality of zones, wherein event information are based on the event notification messages.

In still another aspect, policy for capturing streaming data and monitoring events is established on a per-server and per-device basis.

In yet still another aspect, the policy comprises one or more of: a) keep recordings until the storage medium reaches a predetermined limit, then stop recording, b) when the accumulated storage reaches or exceeds a predetermined limit then delete the oldest recordings until the storage medium is under the limit, c) delete recordings beyond a predetermined age, d) delete recordings containing or alternatively not containing predefined events, e) copy recordings beyond a predetermined age to a different storage medium, such as a long term storage, f) move recordings beyond a predetermined age to a different storage medium, such as a long term storage, g) copy (replicate) recordings containing or alternatively not containing predefined events to a different storage medium, such as a long term storage, and h) move recordings containing or alternatively not containing predefined events to a different storage medium, such as a long term storage.

In one aspect, a deletion policy is established on a per-server basis for recorded media segments and event notification messages.

In another aspect, a video capture component captures an image snapshot upon detection of an event, and saves an associated event notification message and the image snapshot to the distributed database.

In another aspect, the image snapshot comprises one or more pieces of information relating to the image snapshot at or around the time of capture, including one or more of: a data format, a limited series of static images, a short video clip, a processed representation of the image snapshot, a marked-up representation of the image snapshot with overlayed information, a data structure of derived information from the image snapshot, and a data structure of environmental information.

In yet another aspect, the distributed database further stores event information that includes one or more of: a) the identifier of the video source, b) the zone of the video source, c) the type of event, d) text description of the event, e) time of the event and f) the snapshot of the event.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF DRAWINGS

In the drawings, embodiments of the invention are illustrated by way of example. It is to be expressly understood that the description and drawings are only for the purpose of illustration and as an aid to understanding, and are not intended as a definition of the limits of the invention.

FIG. 8 shows a representation of a Device administration screen in accordance with one embodiment of the invention.

FIG. 9 shows a representation of a Location administration screen in accordance with one embodiment of the invention.

DETAILED DESCRIPTION

Figure 1:
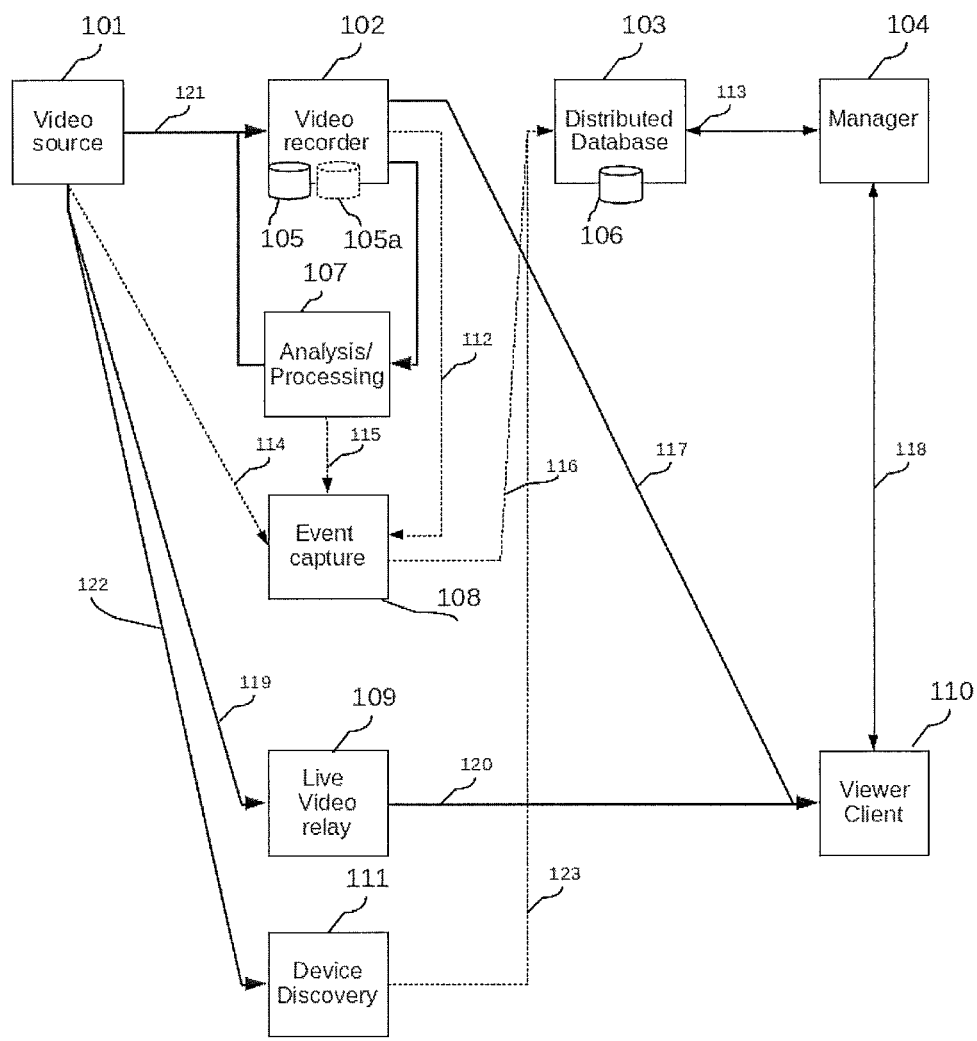
FIG. 1. shows the system components and the data flow between components in accordance with one embodiment of the invention.

A novel and innovative computer network implemented digital video surveillance system is provided. The system enables the management of large amounts of video surveillance data in an efficient and scalable manner, that was not possible using prior art solutions.

Generally speaking, each video capture device may provide up to four kinds of data: one or more channels of streaming image and audio data, video image snapshots on demand, operational status of the device and event notifications, such as, for example, motion detected within the image. Said data may then be distributed to one or more data storage servers in one or more physical locations from where it is made available by means of network protocols for remote viewing and analysis. The network connections between each data storage server and the cameras sending data to it may be sized appropriately based on the volume of data being sent.

This disclosure teaches a novel and innovative way to integrate the various components of an intelligent computer network implemented video surveillance system incorporating a plurality of video capture devices, generally placed at functionally optimal locations. The video capture devices are connected to a data network to support the capture, recording, processing, storage, analysis, viewing, playback, logging and event-monitoring of video and audio information, coupling them to a distributed database and having them appear in a uniform, seamless interface to the administrative users.

For example, a video capture device may capture and/or stream video to a recording device using a dedicated, high performance local area network, whereupon the recording device stores the video on one or more co-located storage devices. A video process may convert this data into a more desirable format and may also notify the database device whenever a new video segment is added to the storage device. The database device may share this information with other database devices in a distributed manner. Ultimately, a client device may query the distributed database(s) over the Internet for one or more video recordings and may obtain from the database(s) the identifiers and network locations of the video recordings, the network location containing, for example, the server network address and zero or more proxy pathways for the retrieval of the video recording segment via the Internet.

This approach permits a recording device to change dynamically the storage of video from one recorded segment to the next, for example by automatically switching to a new storage device when the current storage device is full, without affecting the retrieval capabilities of the client devices.

The computer network implemented system includes a plurality of video processing components that are connected to a computer network that is configured as a data network. Each video processing component is configured to perform one or more of the capture, relaying, recording, processing, storage, analysis and event-monitoring of video and audio information. The data network connects each video processing component to at least one analysis component, at least one event-monitoring component, and at least one recording component; where these components are part of the data network. The analysis component transmits event notification information to the event-monitoring components and each capture component transmits streaming data to one or more associated recording components, said recording component converting the streaming data into a succession of compressed media segment files, storing each file on a storage medium and transmitting a notification message to one or more event-monitoring components on a file by file basis. The event-monitoring components receives notification messages from one or more video processing components, and automatically updates a distributed database with said notification data and optionally forwards said events to one or more selected components, for example the video recording component to allow events to appear as tags in the recorded video segments. A data format allows the notifications to be delivered to the relevant points in the data network, and also for components requiring access to this information carried in notifications, this information is made available through the distributed database.

This particular network architecture allows for example video surveillance systems to be expanded seamlessly and without creating integration problems. Also the data network can respond to different arrangements for example in terms of local storage, or storage in the cloud, and hierarchies of rules—some of which may be applied selectively for example only to a select group of network components, or network components at a defined location. Changes to these configurations can also be made dynamically using the particular network architecture described.

The computer implemented method of the present invention may be described as, in a computer system including a plurality of video processing components operatively coupled by a data network each component implementing one or more tasks of, but not restricted to; discovering said components and the capture, relaying, recording, processing, storage, analysis and event-monitoring of video and audio information: (A) each analysis component transmitting event notification information to one or more event-monitoring components; (B) each video capture component transmitting streaming data to one or more associated recording or relay components, (C) the recording component converting the streaming data into a succession of compressed media files, and storing each file on a storage medium and transmitting a notification message to one or more event-monitoring components, (D) the one or more event-monitoring components receiving the notification messages from one or more video processing components, and updating a distributed database with said notification data and optionally forwarding said events to one or more selected components.

In one aspect of this invention a data format is taught that provides distributed information about the status, configuration, events and recordings available in the network. The data format enables the distributed components to find and retrieve the information for purposes of live viewing, processing, analysis, display, playback and system management. In a further aspect of the invention, the data format incorporates signature fields so that the data records may be digitally signed by their originator devices in order to certify the integrity of the data. The said devices may publish their public keys by means of a system of certificates in order that the digital signatures may be decoded and the associated data records verified.

Figure 2:
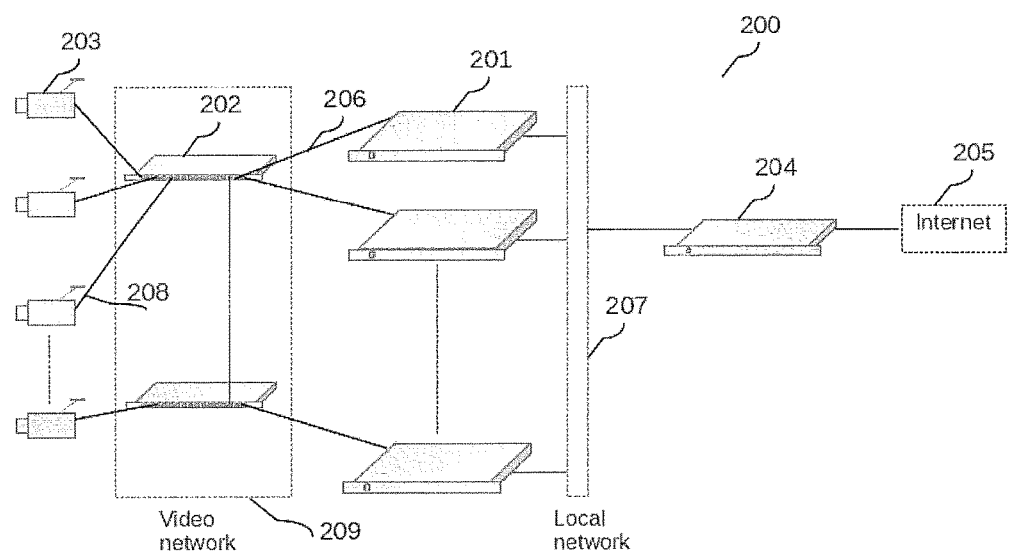
FIG. 2 shows the hardware layout for in accordance with one embodiment of the invention.

The invention herein is described with reference to a possible hardware embodiment as shown in FIG. 2 and also in reference to an alternate possible hardware embodiment shown in FIG. 3. There may be other hardware variations that may also embody this invention.

The video source 101 captures and compresses the video image into a streaming video format, such as but not limited to, MJPEG or h.264 and transmits this over the network to the Video capture component 102 using the well-known Real-Time Streaming Protocol (RTSP). One of a plurality of video capture components 102 collects the data from each video stream until it has a predetermined amount, at which point it saves the data into a data file in data store 105. In one exemplary embodiment, the predetermined amount can be based on time, so that the size of the file will vary depending on the image size, compression format used and the quality of the video.

In one possible implementation, further processing of the video file may be undertaken to transform the data and generate a different, typically (but not necessarily) smaller, data file in a standard format, such as mp4 or Ogg, suitable for distribution to viewer clients, which may be saved in the same data store 105 or, in an alternate embodiment, in a different data store 105a. The transformation may, as an option, include further processing steps including, but not limited to: encrypting the contents with a digital key, digitally signing the data file or supplementing the video data file with additional information such as camera name and location. The original file may then be deleted, although in a different embodiment it may be retained for further processing or as redundant data storage, to be deleted later.

The new data file may be persisted in the video data store 105 or the alternate data store 105a and a network message may be sent to the database component 103 to register the presence and location of the new file. Database component 103 may persist the new file information in storage 106. In one embodiment, the database may be for example a relational database such as a MySQL database.

Multi-Processor Embodiment

FIG. 2 shows a computer network implemented system that includes camera devices 203 each of which is connected to one of a plurality of network switches 202 to form a private Video network 209. The size of the video network 209 may vary in number of switches and geographic distribution.

In one implementation, a hardware arrangement is used that is suitable for a large, private video network of IP network cameras. Each camera 203 is connected to a Power-over-Ethernet (PoE) switch 202 via a network cable 208 in a manner that is well-known. Switches may be distributed using Gigabit Ethernet connections to other switches to extend both the number of cameras supported and the geographical coverage of the network. Each of a plurality of Video servers 201 is connected to the video network by a Gigabit Ethernet connection 206. Each of the Video servers 201 is also connected to a Local network 207. In terms of the system components illustrated in FIG. 1, each camera 203 acts as a video source 101 and each video server 201 acts as a video capture component 102, event capture component 108 (or also referred to as event-monitoring component 108) and live video relay 109 and including video storage 105. Each video server 201 is also connected to local network 207. A data server and router 204 is connected to local network 207 as well as the Internet 205, said data server 204 including a database 103 and manager 104 to facilitate access control and presentation of database information to viewer client 110.

Distributed-Via-Internet Embodiment

Figure 3:
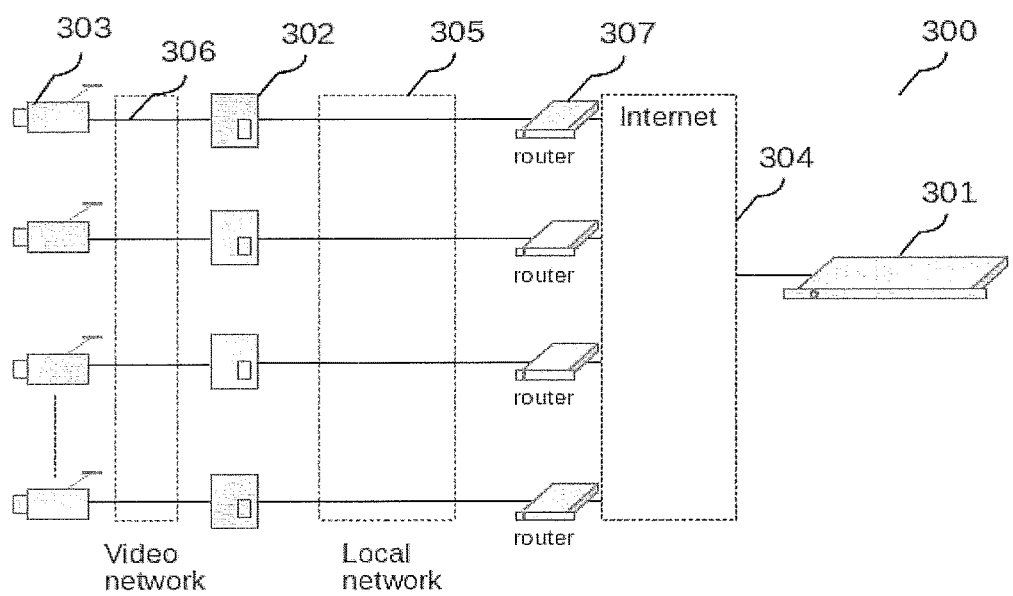
FIG. 3 shows the hardware layout in accordance with another embodiment of the invention.

Another possible implementation is the Internet distributed embodiment shown in FIG. 3. This embodiment comprises a system of distributed cameras 303 as video source 101, where each camera is connected by means of a video network 306 to a video server 302. Each Video server 302 is connected by means of a Local network 305 to a network router 307 and then to an Internet server 301 via the Internet 304. In some embodiments, the video network 306 and the Local network 305 may be the same network. In this embodiment, the video server 302 supports video capture 102, event capture 108 and live video relay 109. The video server 302 may also send event, recording and status information to the Internet server 301 where this information is stored in the database component 103. Internet server 301 may be a dedicated server computer located on the Internet. A Viewer Client 110 may log in to the Manager component 104 on the Internet server 301 and access the information in the database 103. For the case where the viewer client 110 requires to view live video data, the Manager 104 may redirect the viewer client to establish a network connection with the appropriate router 307 over the Internet. In an alternate embodiment, for networks where a direct network connection is not possible, for example where the router is located behind a firewall, the viewer client may establish a connection with a network tunnel proxy that will forward the connection to the router associated with the desired live video data. For the case where viewer client 110 requires to view a particular recorded video data file, the Manager 104 may redirect the viewer client to retrieve the said data file from a location on the Internet where the said data file is stored. For example, in this embodiment the video file may be on video server 302.

In another aspect of the invention, Internet service 301 may be a virtual cloud computer hosted on the Internet or it may be a software service hosted by a service provider. In yet another embodiment, Internet server 301 may be made up of a cluster of two or more computers distributed over one or more locations to provide distributed database 103 and manager 104 functions to a plurality of Viewer clients 110.

Discovery, Registration and Provisioning

In one aspect of an exemplary embodiment, discovery of video sources 101 occurs automatically from the device discovery component 111 using one or more standard discovery protocols, such as WS-Discovery. Discovery at the local level avoids the top-down configuration problems that occur when a large number of network devices have to be centrally predetermined and provisioned. When a video source, such as a camera, is discovered it may be further interrogated using an industry-standard camera interface protocol to obtain detail capabilities and validate security credentials of the video source, including determining suitability for, and admissibility to, the network.

Following the interrogation, a device object 402 may be created for the camera and added to the database 103. In an exemplary embodiment each video source is identified by an id number, such as universally unique identifier (UUID), as well as a name and location. Configuration of the name and location(s) within the video source can be undertaken prior to commencing the discovery process within the video source so that the discovery process is able to correctly identify and locate the video source. However, in another aspect of the invention, the name and location configuration of the video source may be modified at any time and the discovery process may be repeated. In yet another aspect of this invention, the name and location of the video source 101 may be overridden during the discovery process to accommodate the situation in which the video source 101 publishes a name and location that may be erroneous.

In an example use case of this configuration, FIG. 8 shows a representative administration screen that demonstrates how a discovered device may be managed, including whether to persist the device information in the database as a valid video source or not.

Locations and Devices

Figure 4:
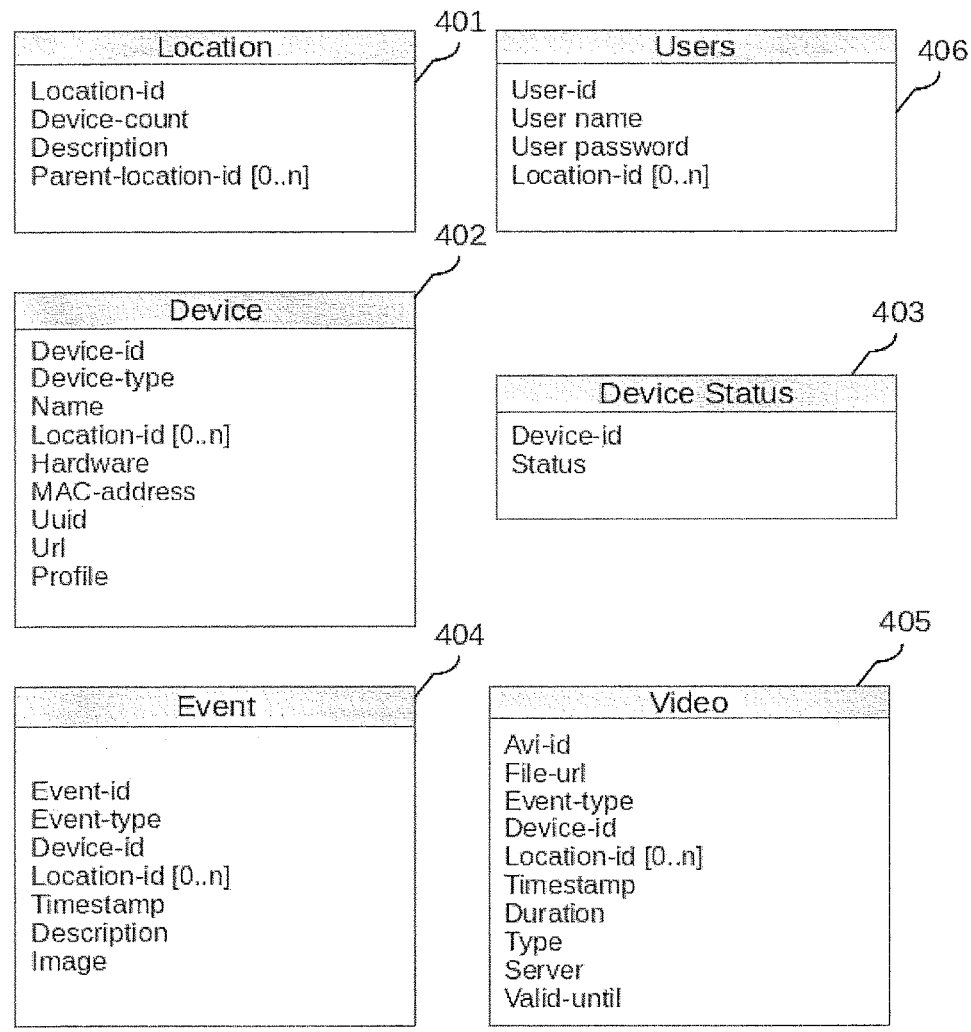
FIG. 4 shows the database elements needed to represent and manage the system in accordance with one embodiment of the invention.
Figure 5:
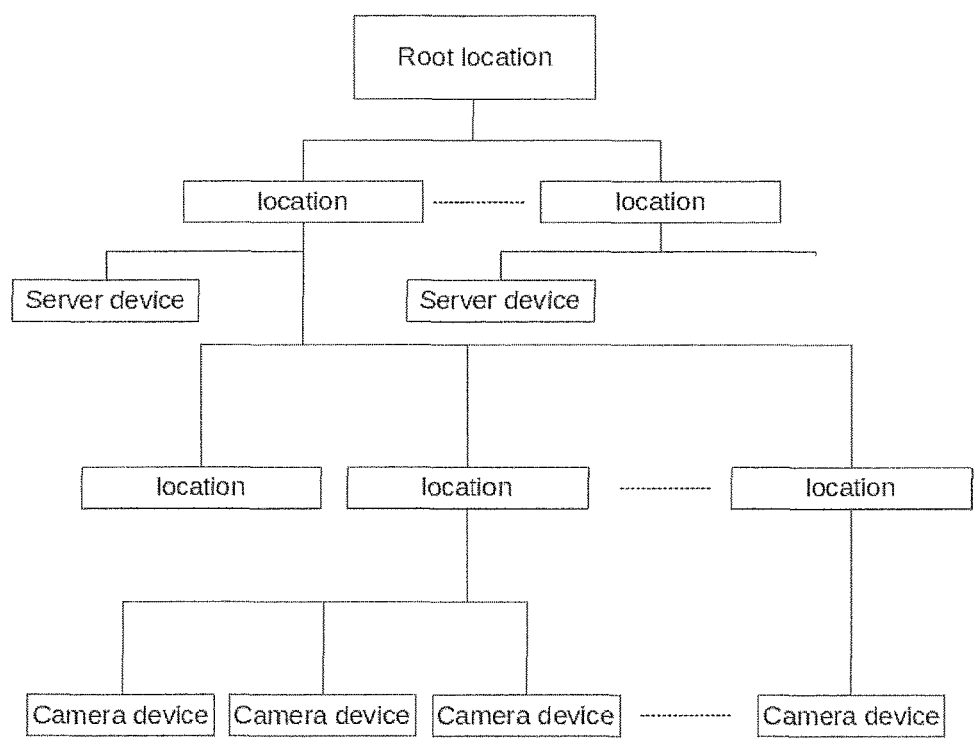
FIG. 5 shows the logical organization of location and device elements in accordance with one embodiment of the invention.

Locations (also referred to as "zones" in this disclosure) may be defined by the system administrator, for example using a hierarchy arrangement as shown in FIG. 5. In the preferred embodiment, each video source 101 may be associated with zero or more locations and this association may be recorded in the database component 106. As the name suggests, locations may be associated with physical locations of video sources, for example 'Ground floor'. In another aspect of this invention, locations may be associated with logical locations, for example 'Reception'. FIG. 4 shows the database component storing information on each location 401 and each device 402, such as the video source 101. In yet another aspect of this invention, a device 402 may be associated with a plurality of locations 401, for example a video source 101 may be associated with both 'Ground floor' location and 'Reception' location. The significance of the locations 401 is to allow Manager 104 to perform queries and searches of database 103, for example in order to group devices in a web-browser User Interface for viewer client 110.

In another aspect of the invention, access by users may be controlled on a location-by-location basis such that users may only have access to video and event information associated with the locations for which the said Users are authorized. When a user is provisioned to make use of the system, the user account must be associated with one or more Locations that the User is authorized to view. If a higher-level Location in the hierarchy is associated with the user, the user will be authorised to view all the lower-level Locations for which the higher-level Location is a parent Location. The Manager 104 may make use of the Location association for a User to give the said user access to authorized information only by means of the User Interface for viewer client 110.

In an example use case of this configuration, FIG. 9 shows a representative administration screen that demonstrates how a plurality of locations may be managed, including whether specific users are permitted access to devices associated with particular locations.

Streaming, Recording and Event Capture

In this invention, video sources 101 may be configured to continuously stream video and optionally audio information to video capture component 102. In cases where audio data is captured, audio will be considered part of the video data transmission and storage. In one embodiment, the well-known standard Real-time streaming protocol (RTSP), Real-time Transport Protocol (RTP) and User Datagram Protocol (UDP) may be used, although in different embodiments other protocols and variations thereof may be employed.

For example, the present system may support well-known standard video compressions, e.g. MJPEG and H.264 and u-law audio compression, although other compressions and variations thereof may also be employed. The present system may supports resolutions from low resolution to very high definition (HD), depending on the capabilities of the video sources. The system may also allow the streaming configuration to be selected from one of the discovered configuration profiles for each video source based on either a) default criteria set by the administrator or b) selection of a particular profile for the said video device in the administration interface. In an example use case of this configuration, FIG. 8 shows a representative administration screen that demonstrates how a profile may be selected from a list of profiles.

Live video display is provided by the Live video relay 109. This live video relay 109 obtains a single stream of video from the Video Source 101 and transmits this to one or more Viewer Clients 110. In certain implementations of the invention, a Viewer Client 110 may be a standard web browser client and may not be capable of accepting the same format or the same bandwidth generated by the Video Source 101 and for this case the Live Video Relay 109 may translate the video stream into a form supported by the Viewer Client 110. In an exemplary embodiment 200 the path between the video server 201 and the Viewer Client may include a Local Area Network 207 and it may also include the Internet 205 via the data server and router 204.

Streaming video data are continuously captured by the video capture component 102 to temporary data storage. Depending on the configuration set by the administrator, the said temporary data may be persisted to a permanent storage device on a server, such as a hard disk drive, under the following settings; a) periodically every preset number of seconds so that all data is captured, for example every 180 seconds, b) periodically every preset number of seconds within a predetermined time window, as set by the administrator, for example between 6 am and 6 pm, c) only whenever an event, such as motion detection, is received, causing the persistence of video data captured a minimum number of seconds before the event and a minimum number of seconds after event, d) a combination of b and c, and e) disabled, or no data captured. In an exemplary embodiment, such a setting may apply collectively to all video capture components, components associated with a particular location or may be administratively set for any particular video capture component 102. In order to manage the video efficiently, this invention teaches the tagging of individual video files to include the following information; a) AV system prefix, b) identifier of the video source, c) start time of the video/audio, d) length of recording in seconds, e) events contained in the video/audio segment and f) format of the video/audio file. Database storage for each video recording may include the tag information and may also include the device name, video source location, server identifier and Uniform Resource Locator (URL) of the file.

Under typical circumstances, the data storage may grow until the storage space is depleted. This invention teaches a method and system for addressing this problem by establishing a deletion policy. The deletion policy may be created for the system overall or on a location-by-location basis. Alternatively it may be created for one or more of the individual video sources to override the system policy or the location policy. The policy may specify the behaviour of the video file handling according to one or more combinations of the following: a) keep recordings until the storage reaches a predetermined limit, then stop recording, b) when the accumulated storage reaches or exceeds a predetermined limit then delete the oldest recordings until the storage is under the limit, c) delete recordings beyond a predetermined age, d) delete recordings containing or alternatively not containing predefined events, e) copy recordings beyond a predetermined age to a different storage medium, such as long term storage, f) move recordings beyond a predetermined age to a different storage medium, such as long term storage, g) copy (replicate) recordings containing or alternatively not containing predefined events to a different storage medium, such as long term storage, h) move recordings containing or alternatively not containing predefined events to a different storage medium, such as long term storage.

Most network video cameras support video motion detection and some support additional event detection as well, and these events are transmitted to the Event capture component 108. In addition, a separate analysis component 107 may be provided to analyse and process the incoming data stream and may also generate Video events. Video events may be received at the event capture component 108 by means of notification messages 114 from a video source 101 or by notification messages 115 from Analysis component 107. In the an exemplary embodiment the notification messages may be sent using the HTTP protocol in a format that is understood by the event capture component 108. For example, the message may include the information: "event: motion" to signify motion detection. In different embodiments, formats may include SOAP/XML, JSON encoding or other encoding methods. The event capture component 108 decodes the event and invokes an event procedure associated with the event. In one exemplary embodiment this may include the steps of: instructing the video capture component 102 to tag the video stream with the event information, capturing an image snapshot as close to the time of the event as possible; and forwarding the event and the snapshot in a standard format to the Database component 103 for saving to storage 106. In an exemplary embodiment the snapshot may comprise a static image in the jpeg format. However in another embodiment it may comprise one or more pieces of other information relating to the image at or around the time of capture, including images of other formats, a limited series of static images, a short video clip, a processed representation of the image, a marked-up representation of the image with overlayed information, a data structure of derived information from the image and the environment and so on. The video capture component 102 may return an image snapshot from the video source 101 to the event capture component 108, corresponding to the time of the event. The event capture component 108 may also forward the message to the database 103 where it may be persisted to data store 106. The information stored in the database may include: a) the identifier of the video source, b) the location of the video source, c) the type of event, d) text description of the event, e) time of the event and f) the snapshot of the event.

Figure 6:
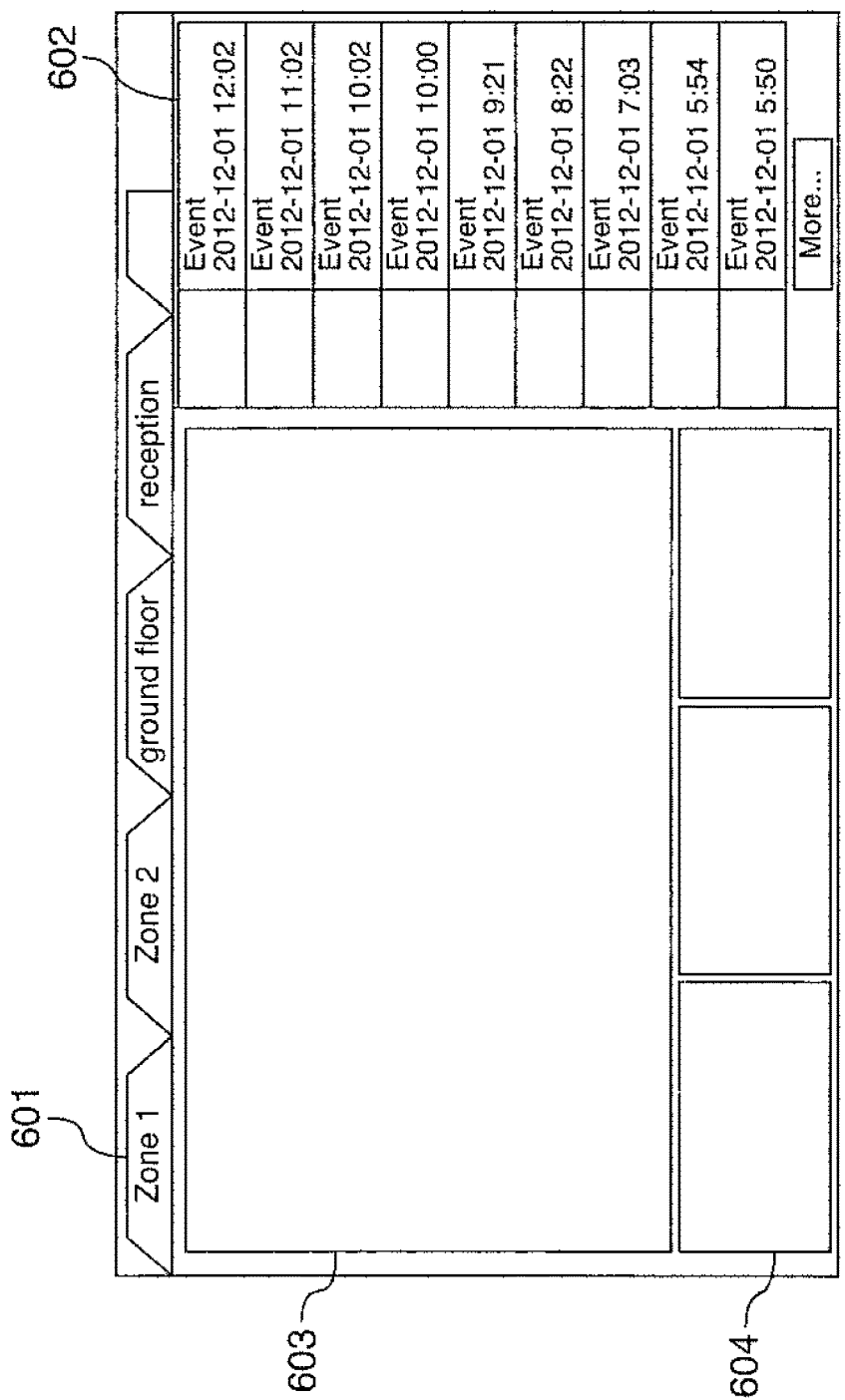
FIG. 6 shows a representation of a live video screen for a location in accordance with one embodiment of the invention.

In an example use case of an Internet viewer client, FIG. 6 shows a representative user screen that presents live video displays for a selected location 601 from a plurality of locations, including a focal display 603 selected from one of the thumbnail displays 604. Continuously updating Event log 602 associated with the selected location is also shown, where each event comprises a snapshot 605 and a text description 606.

Video Search and Playback

Previously recorded video display is provided by the Video Capture component 102 to the Viewer Client 110. In an exemplary embodiments, the Viewer Client 110 first makes a request to the Manager component 104 to obtain a list of one or more available recorded video segment files according to query parameters chosen by the Viewer Client 109. The Viewer Client 110 then selects, in sequence, one or more segments from the list and requests the Video Capture component 102 to retrieve the segments and send them to the Viewer Client 110 for display. The retrieved video segments are then displayed by the Viewer Client 110 video player application. In an exemplary embodiment, the Viewer Client 110 is also enabled to download a copy of the retrieved segment and store in on a local media device, such as removable data drive, or to forward it using an e-mail software application.

Figure 7:
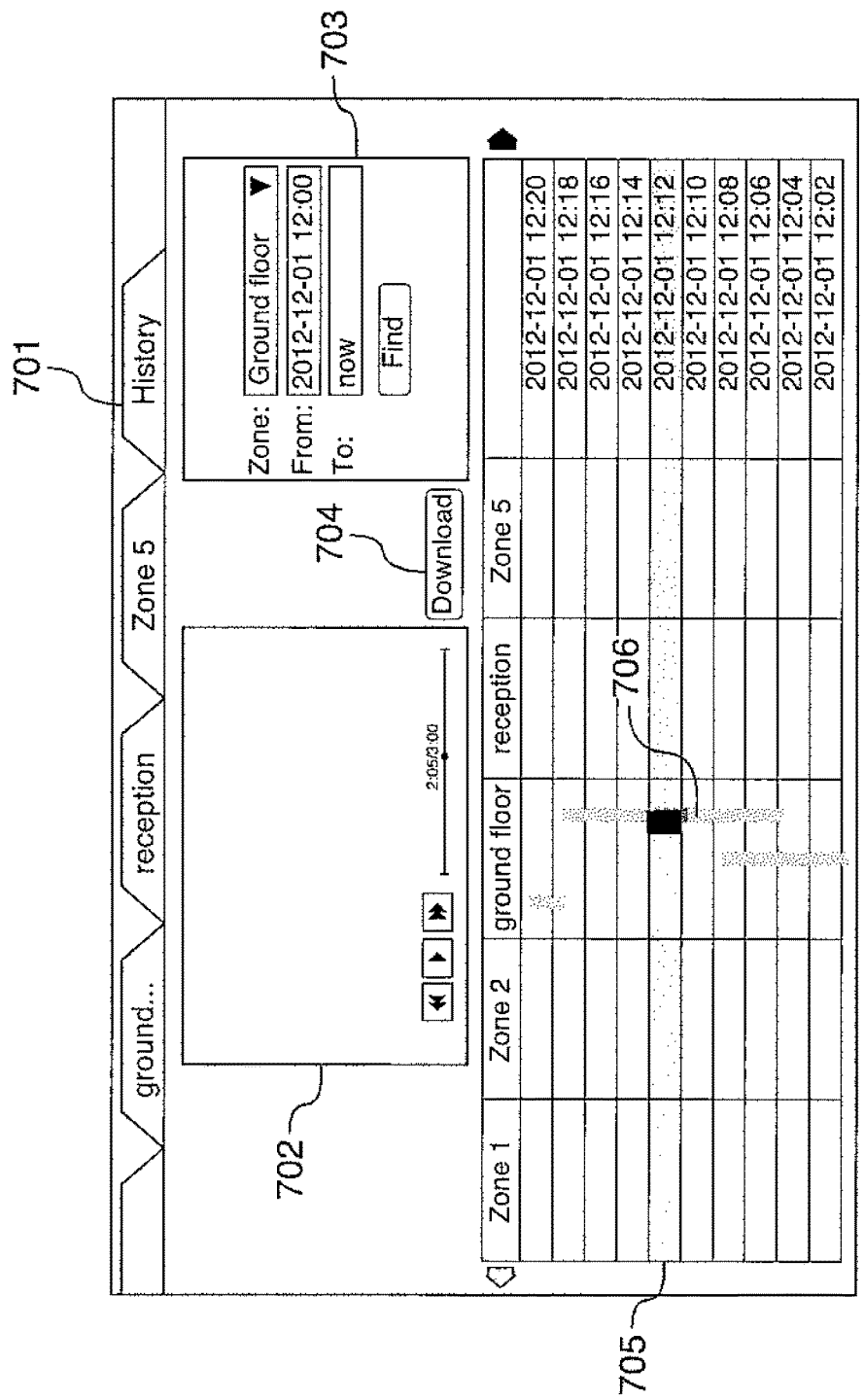
FIG. 7 shows a representation of a video history screen in accordance with one embodiment of the invention.

In an example use case of an Internet viewer client, FIG. 7 shows a representative user screen that presents recorded video segments for one or more selected locations 705 from a plurality of locations and times by means of selection window 703. By clicking on the desired segment 706 the associated recording will appear in the playback window 702 and also may be made available for download as a file via download button 704.

The invention claimed is:

1. A computer implemented method of establishing and managing a geographically distributed video surveillance network comprising a plurality of independent video processing components operatively coupled to a data network, each independent video processing component configured to implement one or more tasks, the one or more tasks comprising video capture, relaying, recording, processing, storage, displaying, live viewing, analysis and event-monitoring of video and audio files and information, the method comprising:

discovering and registering each video capture component of the plurality of independent video processing components with a distributed database, wherein the discovering is performed at geographically distributed locations, and wherein the discovering comprises determining at least one of capabilities, name settings, zone settings, admission suitability, and security credential validation of one or more devices associated with the video capture component;

transmitting streaming data, by each video capture component, to one or more associated recording components of the plurality of independent video processing components;

converting the streaming data into a succession of data segments;

storing each of the data segments on any of a plurality of non-transitory, network-accessible, computer-readable storage media;

transmitting a storage event notification message to one or more of the video processing components when a new data segment is stored;

generating a plurality of video media segments based on the data segments, wherein the plurality of video media segments are in one or more standard formats suitable for at least one of distribution to client devices and viewing on client devices;

storing the video media segments on at least two of the plurality of non-transitory, network accessible, computer-readable storage media, wherein at least one of the plurality of video media segments from a first video capture component of the video capture components is stored at a first physical storage location and wherein at least another of the video media segments from the first video capture component is stored at a second physical storage location different from the first physical storage location;

notifying the distributed database when a video media segment is added to any of the plurality of non-transitory, network accessible, computer-readable storage media, wherein the notifying comprises sending a notification including a uniform resource locator (URL) of the physical storage location of the video media segment in the plurality of non-transitory, network accessible, computer-readable storage media and a tag of the video media segment, wherein the tag includes the identifier of the video source, a start time of the video, and a length of the video media segment, and wherein the determination of name settings and zone settings of the one or more devices associated with the video capture components is performed prior to discovering the one or more video capture components, and wherein the name settings and zone settings of the one or more devices associated with the video capture components are overridden during or after discovering of the one or more video capture components.

2. The method of claim 1, further comprising forwarding received storage event notification messages to one or more selected video processing components.

3. The method of claim 2, wherein the distributed database is operable to use a data format that records status, configuration, events, and recording locations available in the data network, wherein the data format enables one or more video processing components to find and retrieve information needed for live viewing, processing, analysis, display, and playback of videos, and system management.

4. The method of claim 1, wherein at least one of the storage event notification message and the data segments is digitally signed by respective originator devices to certify integrity.

5. The method of claim 1, wherein one or more video files are tagged to include information representing one or more of: system prefix, identifier of video source, start time of the video, length of recording in seconds, events contained in the data segment and/or format of the each of the one or more video files.

6. The method of claim 1, wherein unprocessed video files are retained for further processing, or as redundant data storage to be deleted later.

7. The method of claim 1, wherein the storage event notification comprises a location of the new data segment in the any of the plurality of non-transitory, network-accessible, computer-readable storage media.

8. The method of claim 1, wherein a record of each of the data segments in the distributed database comprises at least one of tag information, device name, device zone, server identifier and location of the data segment.

9. The method of claim 2 wherein the distributed database is uniformly accessible by all client devices of the data network.

10. The method of claim 2 further comprising a deletion policy, established on a per-server basis, for recorded data segments and storage event notification messages.

11. The method of claim 2 further comprising capturing an image snapshot by a video capture component upon detection of an event, and saving of an associated event notification message and the image snapshot to the distributed database.

12. The method of claim 11 wherein the image snapshot comprises one or more pieces of information relating to the image snapshot at or around the time of capture, including one or more of: a data format, a limited series of static images, a short video clip, a processed representation of the image snapshot, a marked-up representation of the image snapshot with overlayed information, a data structure of derived information from the image snapshot, and a data structure of environmental information.

13. The method of claim 12 wherein the distributed database further stores event information that includes one or more of: a) the identifier of the video source, b) the zone of the video source, c) the type of event, d) text description of the event, e) time of the event and f) the snapshot of the event.

14. A distributed video surveillance network system comprising a plurality of independent video processing components operatively coupled to a data network, each independent video processing component configured to implement one or more tasks, the one or more tasks comprising video capture, relaying, recording, processing, storage, displaying, live viewing, analysis and event-monitoring of video and audio files and information, the system comprising:

a plurality of non-transitory, network-accessible, computer-readable storage media;

a client device;

one or more components for discovering and registering each video capture component of the plurality of independent video processing components with a distributed database, wherein the discovering is performed at geographically distributed locations, and wherein the discovering comprises determining at least one of capabilities, name settings, zone settings, admission suitability, and security credential validation of one or more devices associated with the video capture component; and one or more recording components associated with each of the video recording components;

wherein each of the one or more video capture components transmits streaming data to the one or more associated recording components, the associated recording components configured to convert the streaming data into a succession of data segments, store the data segments on any of the plurality of non-transitory, network-accessible, computer-readable storage media and transmit a storage event notification message to one or more of the video processing components when a new data segment is stored;

wherein one or more of the plurality of video processing components are configured to:

generate a plurality of video media segments based on the data segments, wherein the plurality of video media segments are in one or more standard formats suitable for at least one of distribution to client devices and viewing on client devices;

store the video media segments on at least two of the plurality of non-transitory, network-accessible, computer-readable storage media, wherein at least one of the plurality of video media segments from a first video capture component of the video capture components is stored at a first physical storage location, and wherein at least another of the video media segments from the first video capture component is stored at a second physical storage location different from the first physical storage location;

notify the distributed database when a video media segment is added to any of the plurality of non-transitory, network-accessible, computer-readable storage media, wherein the notifying comprises sending a notification message including a uniform resource locator (URL) of the physical storage location of the video media segment in the plurality of non-transitory, network-accessible, computer-readable storage media and a tag of the video media segment, wherein the tag includes: the identifier of the video source, a start time of the video, and a length of the segment, and wherein the determination of name settings and zone settings of the one or more devices associated with the video capture components is performed prior to discovering the one or more video capture components, and wherein the name settings and zone settings of the one or more devices associated with the video capture components are overridden during or after the discovering of the one or more video capture components.

15. The system of claim 14, wherein the storage event notification messages are forwarded to one or more selected video processing components.

16. The system of claim 15, wherein the distributed database is operable to use a data format that records status, configuration, events, and recording locations available in the data network, wherein the data format enables one or more video processing components to find and retrieve information needed for live viewing, processing, analysis, display, and playback of videos, and system management.

17. The system of claim 16 wherein at least one of the storage event notification message and the data segments is digitally signed by respective originator devices to certify integrity.

18. The system of claim 14, wherein the video files are tagged to include information representing one or more of: system prefix, identifier of video source, start time of the video, length of recording in seconds, events contained in the data segment and/or format of the each of the one or more video files.

19. The system of claim 14, wherein unprocessed video files are retained for further processing, or as redundant data storage to be deleted later.

20. The system of claim 14, wherein the storage event notification comprises a location of the new data segment in the any of the plurality of non-transitory, network-accessible, computer-readable storage media.

21. The system of claim 14, wherein a record of each of the data segments in the distributed database comprises at least one of tag information, device name, device zone, server identifier and location of the data segment.

22. The system of claim 15 wherein the distributed database is uniformly accessible by all client devices of the data network.

23. The system of claim 15 wherein a deletion policy is established on a per-server basis for recorded data segments and storage event notification messages.

24. The system of claim 15 wherein an image snapshot is captured by a video capture component upon detection of an event, and the video capture component is further configured to save an associated event notification message and the image snapshot to the distributed database.

25. The system of claim 24 wherein the image snapshot comprises one or more pieces of information relating to the image snapshot at or around the time of capture, including one or more of: a data format, a limited series of static images, a short video clip, a processed representation of the image snapshot, a marked-up representation of the image snapshot with overlayed information, a data structure of derived information from the image snapshot, and a data structure of environmental information.

26. The system of claim 25 wherein the distributed database is further configured to store event information that includes one or more of: a) the identifier of the video source, b) the zone of the video source, c) the type of event, d) text description of the event, e) time of the event and f) the snapshot of the event.

27. The method of claim 1, wherein a record of each of the data segments in the distributed database comprises tag information, device name, device zone, server identifier and a location of the data segment.

28. The system of claim 14, wherein a record of each of the data segments in the distributed database comprises tag information, device name, device zone, server identifier and a location of the data segment.

29. The method of claim 1, wherein the video capture components further capture audio, and wherein the video media segments further comprise audio.

30. The system of claim 14, wherein the video capture components further capture audio, and wherein the video media segments further comprise audio.

31. The method of claim 1, wherein a client device is configured to:
- request, from the distributed database, a list of URLs of available video media segments captured by the first video capture component;
- retrieve, via the data network, the video media segments stored at each URL in the list of URLs; and
- display in sequence the retrieved video media segments from the list of URLs as a continuous video on the client device.

32. The system of claim 14, wherein a client device is configured to:
- request, from the distributed database, a list of URLs of available video media segments captured by the first video capture component;
- retrieve, via the data network, the video media segments stored at each URL in the list of URLs; and
- display in sequence the retrieved video media segments from the list of URLs as a continuous video on the client device.

* * * * *